(12) United States Patent
Ross, II

(10) Patent No.: US 6,318,545 B1
(45) Date of Patent: Nov. 20, 2001

(54) CONVEYOR BELT RETURN ROLLER GUARD

(76) Inventor: Paul Douglas Ross, II, 300 Industrial Park Dr., Pell City, AL (US) 35125

( * ) Notice: Subject to any disclaimer, the term of this patent is extended or adjusted under 35 U.S.C. 154(b) by 0 days.

(21) Appl. No.: 09/624,826

(22) Filed: Jul. 25, 2000

(51) Int. Cl.$^7$ .................................................. B65G 21/10
(52) U.S. Cl. ...................................... 198/860.3; 198/497
(58) Field of Search ............................. 198/860.1, 860.3, 198/842, 735.1, 497, 493, 494

(56) References Cited

U.S. PATENT DOCUMENTS

| 3,035,683 | * | 5/1962 | Bishop | 198/860.3 X |
| 3,269,518 | * | 8/1966 | Steinmetz | 198/842 |
| 3,743,078 | * | 7/1973 | Pittoreau | 198/860.3 |
| 4,763,961 | * | 8/1988 | Parrott | 198/494 X |

FOREIGN PATENT DOCUMENTS

| 1121540 | * | 1/1962 | (DE) | 198/860.3 |

* cited by examiner

Primary Examiner—James R. Bidwell
(74) Attorney, Agent, or Firm—Robert J. Veal; Burr & Forman LLP

(57) ABSTRACT

A guard adapted for enclosing an exposed return roller in a conveyor belt system. The guard attachment brackets are adapted to utilize the existing attachment point hardware of the exposed return roller to facilitate guard installation on an existing conveyor system. The attachment brackets provide adjustment of the guard relative the return roller. The guard permits visual inspection to detect accumulation of debris between the guard and return roller. The guard may also be adapted with wiper extensions for cleaning debris from the conveyor belt surface.

9 Claims, 4 Drawing Sheets

CONVEYOR BELT RETURN ROLLER GUARD

FIELD OF THE INVENTION

The present invention is within the general field of conveyor belt transport systems. More specifically, to conveyor belt systems having an exposed return roller extending below the supporting conveyor frame. Most narrowly, the present invention relates to a guard for protecting workers from the hazards associated with exposed return rollers in a mining material production or distribution facility.

BACKGROUND OF THE INVENTION

The present invention relates to conveyor belt systems used in a mining material production or distribution facility. More specifically, the present invention relates to overhead conveyor belt systems where, by elevation of the conveyor belt systems from the manufacturing or distribution facility floor, valuable floor space is reclaimed. While elevation of the conveyor belt system reclaims valuable floor space for the positioning of additional processing stations or movement of items between different locations in a facility, these elevated conveyor belt systems present operational hazards to workers on the facility floor.

Overhead conveyor belt systems are supported by a large frame member, with return roller assemblies supporting the conveyor belts along their return paths. These return rollers are often exposed and extend well below the support frame structures, posing various hazards to workers. The rollers create a pinch point hazard. These extended rollers pose a significant strike hazard to workers walking under the system. These rollers may also fall from the frame members and injure a worker. Additionally, the rollers may fall into other processing machinery causing machinery damage or manufacturing delays. Finally, the exposed rollers may pose a significant pinching hazard, wherein the rollers may draw loose materials or a worker's limbs between the roller and the belt. These hazards are more pronounced where the rollers extend in close proximity to a work station area where a worker's attention will be focused on performing a particular mining, manufacturing or distribution task.

In operations where the conveyors move significant amounts of loose material, the loose materials may adhere to the belts and accumulate in critical locations along the belt track, subjecting the system to additional wear and tear, and premature equipment failures.

Conventional roller guards can protect against many of these hazards. However, these guards often do not permit inspecting the return rollers while the conveyor system is in operation. Thus, the accumulation of debris in the rollers may not be detected until predetermined inspection intervals, which may not be scheduled until after significant damage to the rollers or belt has already been sustained.

Therefore, there is a need for a device that protects workers from the hazards of exposed rollers during operation of the conveyor belt system. The device should also prevent the accumulation of debris in the belt system while providing ready inspection means for detecting the accumulation of damaging debris therein. Similarly, the device should be easily removed to assist maintenance personnel with the removal of accumulated debris.

Similarly, since the guards are intended to improve the safety and reliability of existing conveyor systems, they should be readily adapted to fit a wide range of existing conveyor systems and configurations.

SUMMARY OF THE INVENTION

The present invention provides a return roller guard satisfying all the needs described above. Accordingly, the exposed roller guard of the present invention prevents striking the conveyor system exposed roller by means of a rigid guard member substantially enclosing the exposed roller. This aspect of the guard also serves to contain a roller that has either partially or completely separated from the conveyor system. Additionally, by enclosing the exposed roller, the guard substantially reduces the pinch hazard by preventing the roller from guiding objects towards the pinch point at the junction between the roller and the belt.

According to the present invention, the rigid guard member is provided with a plurality of holes extending through the guard member. These holes permit visual inspection of the area between the roller and the guard member with the conveyor system operating. Moreover, small debris is permitted to fall through these holes thereby preventing their accumulation within the guard.

The roller guard of the present invention may further include a pair of wipers, the wipers cleaning debris from the belt surface before and after encountering the return roller. The wipers further reducing exposure to the pinch hazard of the roller by deflecting obstructions away from the translating conveyor belt.

The guard attachment means of the present invention permit adjustment of the guard relative the roller and further permits adjustment of the wipers against the belt surface. Moreover, the brackets of the present invention permit the guard to be readily hung from industry standard roller attachment brackets permitting easy installation of the guard on existing conveyor systems and facilitating maintenance of the rollers during scheduled and unscheduled maintenance procedures.

BRIEF DESCRIPTION OF THE DRAWINGS

Apparatus embodying features of my invention are depicted in the accompanying drawings, which form a portion of this disclosure wherein.

DESCRIPTION OF THE PREFERRED EMBODIMENT

Figure 1:
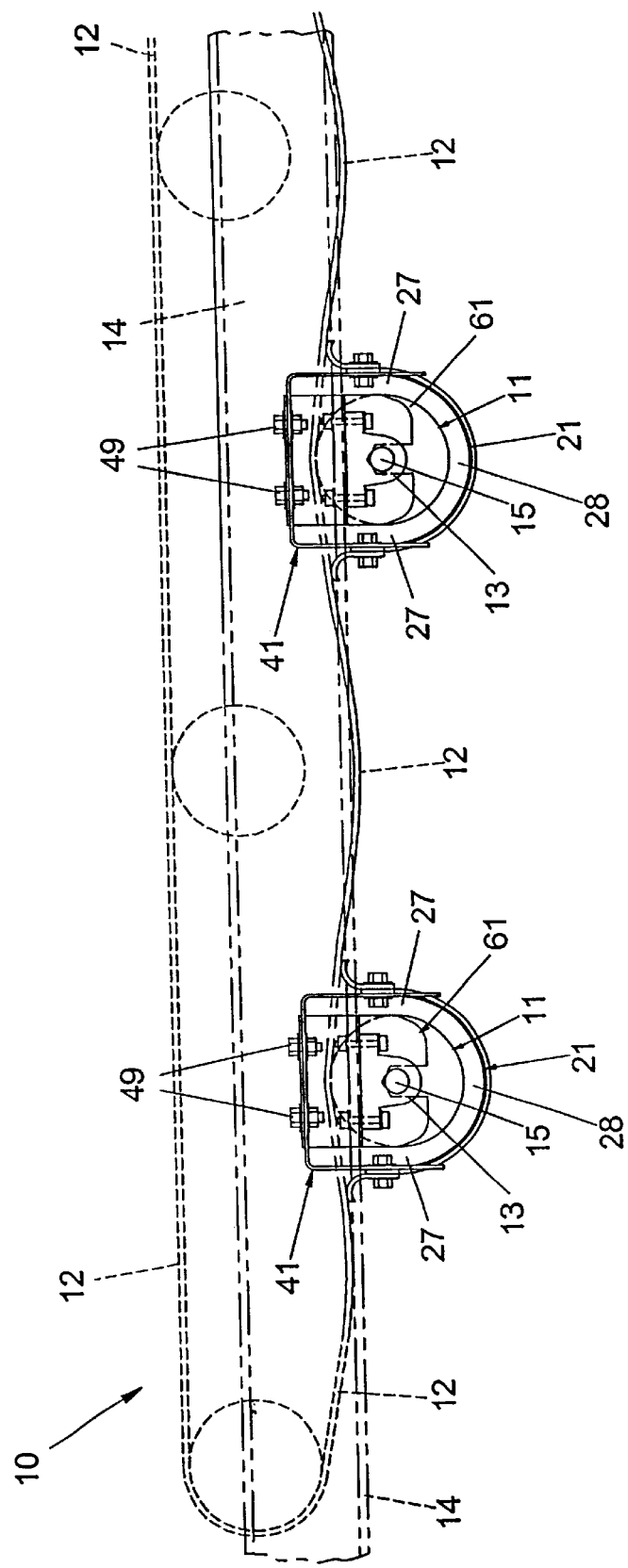
FIG. 1 is a side elevation view of a typical conveyor belt system with the guard of the present invention covering the return rollers.

Referring to the drawings for a clearer understanding of the invention, it may be seen that FIG. 1 shows a typical return roller 11 supporting a conveyor belt 12 of a standard conveyor belt system 10. Return roller 11, having a shaft 15, is attached to a frame member 14 of conveyor belt system 10 by attachment means, such as bolts or pins 16 received through return idler brackets 13. Guard member 21 of the present invention is shown enclosing return roller 11.

Figure 2:
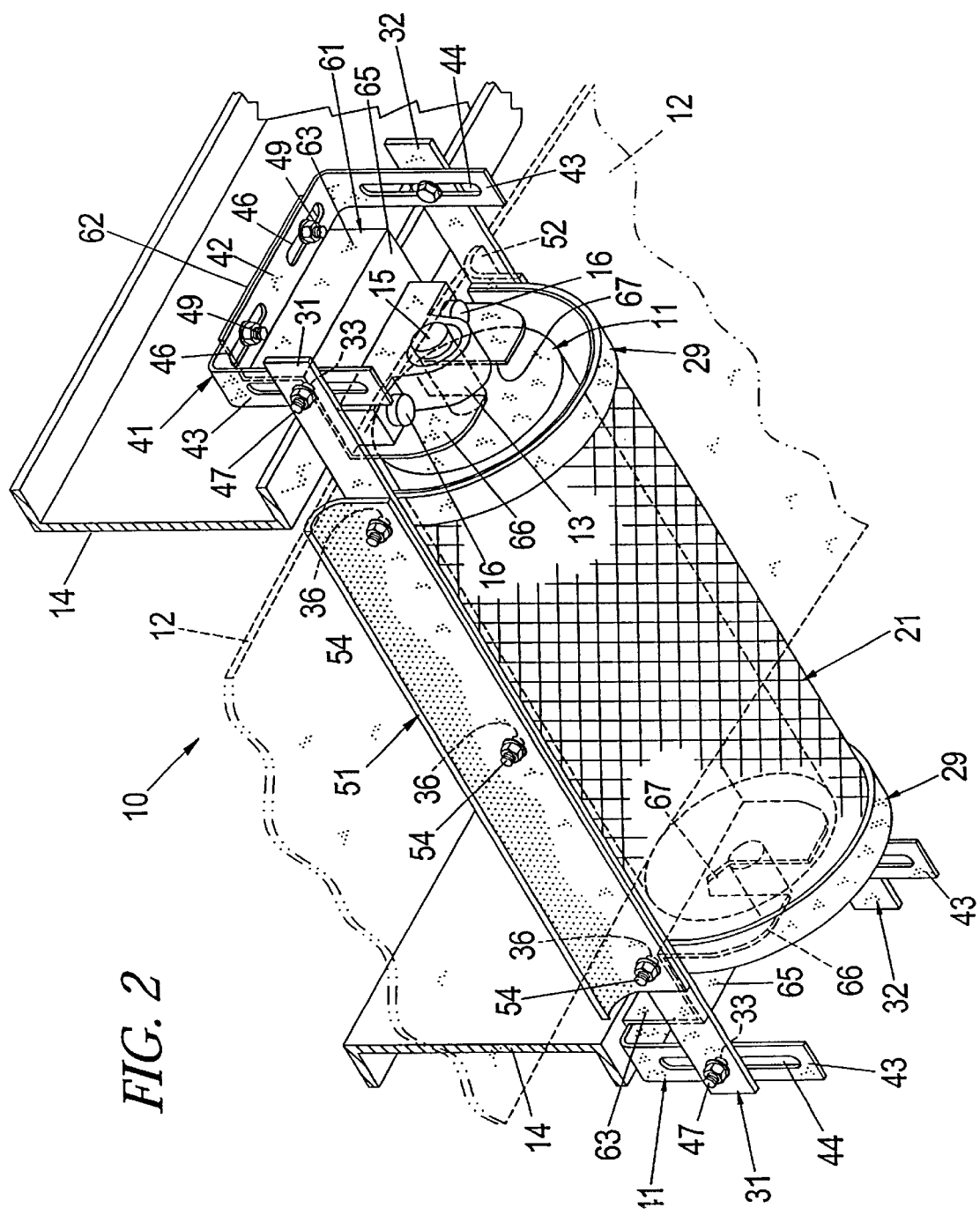
FIG. 2 is a perspective view of a return roller assembly enclosed by the guard of the present invention.
Figure 3:
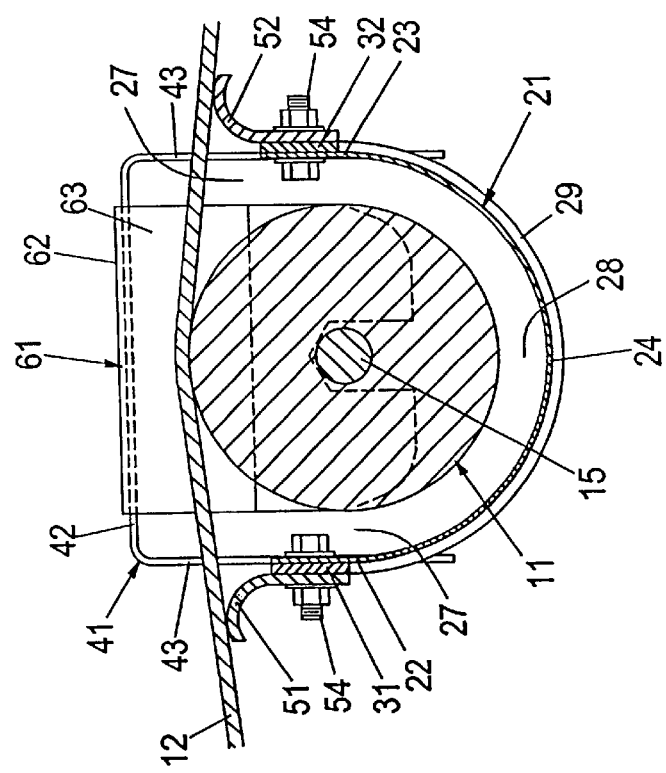
FIG. 3 is a sectional view of a return roller and the guard of the present invention.

As is best seen in FIGS. 2 and 3, in the present embodiment, guard member 21 is formed from expanded metal. However, it will be recognized that guard member 21 can be formed out of many other materials while still providing the benefits disclosed herein. Guard member 21 is substantially U-shaped, defining guard member first 22 and second 23 legs and a guard member arc 24 integrally connecting guard member first 22 and second 23 legs. Guard member arc 24 has a predetermined width corresponding to the diameter of return roller 11, such that a desired lateral clearance 27 is provided between roller 11 and guard member first 22 and second 23 legs. Similarly, guard member first 22 and second 23 legs have a predetermined length corresponding to the diameter of return roller 11, such that a desired vertical clearance 28 is provided between roller 11 and guard member arc 24. Guard member 21 has a predetermined longitudinal length corresponding to the longitudinal length of return roller 11.

End bands 29 are attached by a spot weld, or similar means, to opposite ends of guard member 21. End bands 29 are substantially U-shaped corresponding to the U-shape of guard member 21. End bands 29 provide guard member 21 additional structural support and a smooth finished edge.

First 31 and second 32 support bars are attached by spot weld, or other attachment means, along the longitudinal length of guard member first 22 and second 23 legs respectively. First 31 and second 32 support bars provide attachment points 33 at each end thereof for attachment of guard member 21 and support bars 31 and 32 to end brackets 41.

End brackets 41 are formed in a bridge-shape, having a central upper length 42 and guard accepting extensions 43 projecting downwardly and normal the ends of upper length 42. Guard accepting extensions 43 are separated by a distance corresponding to the width between first 31 and second 32 support bars. Guard accepting extensions 43 having a slot 44 for accepting attachment means, such as a bolt or pin 47, through each support bar attachment point 33 for securing guard member 21 to guard accepting extensions 43. Slot 44 further provides vertical adjustment of guard member 21 relative to return roller 11. Upper length 42 has slots 46 for attachment to distal ends 62 of guard mounting brackets 61. Guard mounting bracket distal ends 62 have a plurality of holes substantially aligned with slots 46 to receive attachment means, such as a bolt or pin 49 for attachment of guard member 21 thereto. Slots 46 provide lateral adjustment of guard member 21 relative return roller 11.

Figure 5:
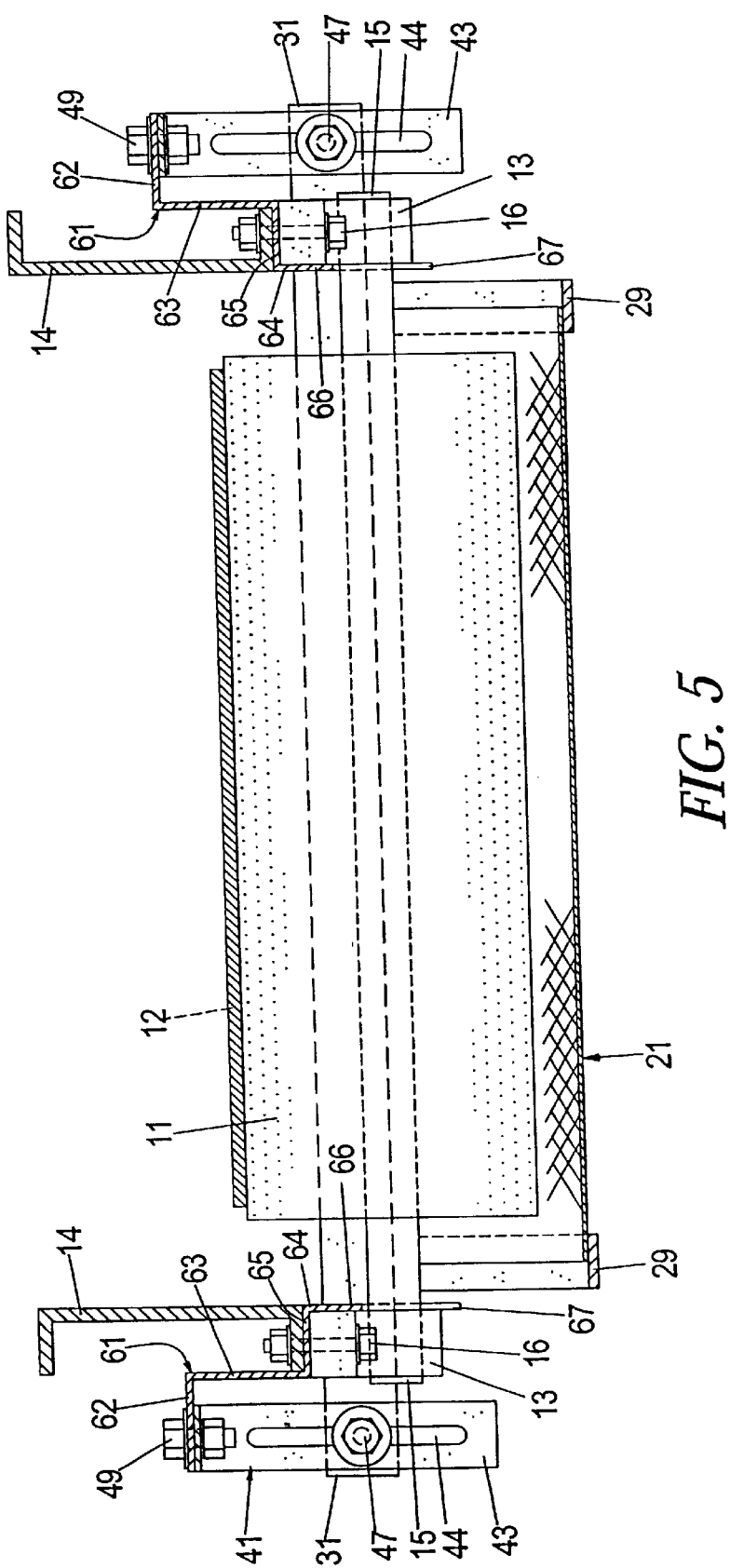
FIG. 5 is an end view of a return roller and the guard of the present invention.

As is best seen in FIG. 5, guard mounting brackets 61 are formed having a step shape with distal end 62 extending substantially horizontal and outwardly from conveyor system 10. A vertical portion 63 extends downwardly from and normal distal end 62 ending at proximal end 64. Proximal end 64 has a horizontal portion 65 and vertical portion 66. Proximal end horizontal portion 65 extends inwardly towards conveyor system 10 and normal vertical portion 63 such that it is positioned between the upper surface of return idler bracket 13, and conveyor system frame member 14. Proximal end horizontal portion 65 has a plurality of holes substantially aligned with return roller attachment means 16 for securing guard mounting brackets 61 to conveyor system 10 without modification to conveyor system 10. Proximal end vertical portion 66 extends downwardly from and normal proximal end horizontal portion 65 such that proximal end vertical portion 66 is in mating contact with the inner face of return idler bracket 13. Proximal end vertical portion 66 has a vertical slot 67 which permits installation and attachment of guard mounting bracket 61 without the need to completely remove return roller 11 while avoiding interference with return roller shaft 15 rotation during operation of the conveyor system 10.

Figure 4:
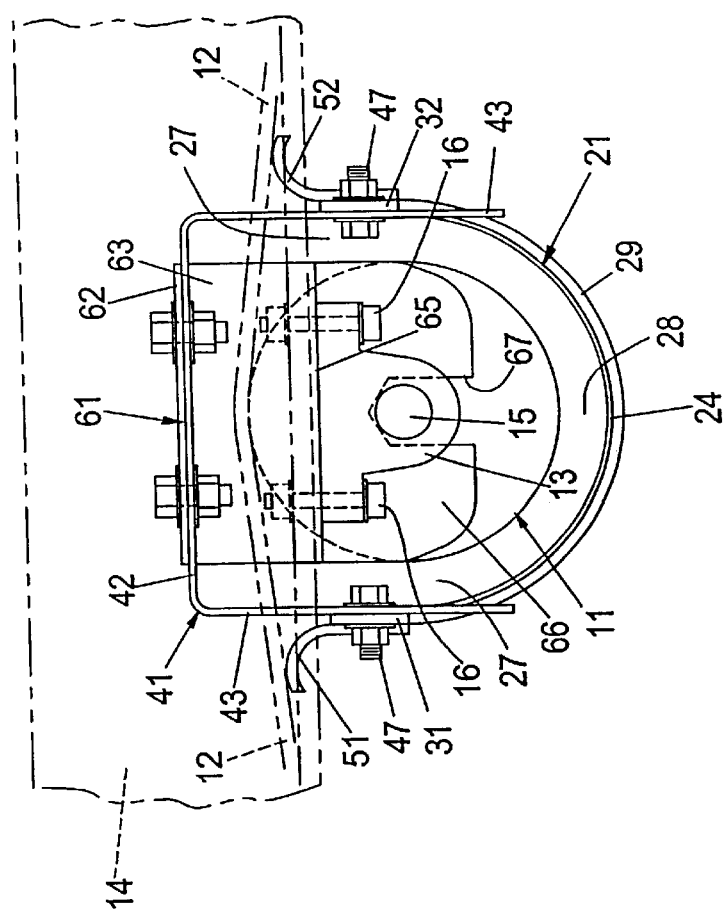
FIG. 4 is a side elevation view of a return roller and the guard of the present invention.

Referring to FIGS. 2, 3, and 4, an optional feature of the present invention can be seen wherein support bars 31 and 32, have a plurality of attachment points 36 for attachment of first 51 and second 52 wiper members. First wiper member 51 curves upwardly and outwardly from first guard member leg 22, such that the distal end of first wiper member 51 is in substantially tangential alignment relative belt 12. Second wiper member 52 curves upwardly and outwardly from second guard member leg 23, such that the distal end of second wiper member 52 is in substantially tangential alignment relative belt 12. First 51 and second 52 wiper members have a plurality of attachment points 53 for attachment to support bars 31 and 32, by attachment means, such as a bolt or pin 54. In the present embodiment, wiper members 51 and 52 are formed out of urethane and are adjusted in wiping contact with belt 12 by utilizing slot 44 adjustment capabilities.

It is to be understood that the form of the invention as shown herein is a preferred embodiment thereof and that various changes and modifications may be made therein without departing from the spirit of the invention or scope as defined in the following claims.

I claim:

1. In a conveyor system having a driven roller and at least one idler roller supported on an elongated frame with an endless belt entrained about said driven and idler rollers, the improvement comprising:

an arcuate covering subtending at least a portion of an arc substantially coaxial with said idler roller proximal the point of contact between said idler roller and said belt to prevent engagement of foreign matter between said roller and said belt; and, an adjustable mounting assembly for securing said arcuate covering to said frame.

2. A guard for a conveyor belt system, the conveyor belt system comprising a frame, a belt, an exposed roller supporting said belt, and attachment means attaching said exposed roller to said frame, said guard comprising:

a guard member substantially enclosing said exposed roller;

said guard member is substantially U-shaped along its longitudinal length, said U-shape defining guard member first and second legs and a guard member arc connecting said first and second legs, said guard member arc having a predetermined width that is wider than said roller diameter by a desired clearance between said exposed roller and said guard member first and second legs, said first and second legs having a predetermined length corresponding to a desired clearance between said exposed roller and said guard member arc, and said guard member having a predetermined longitudinal length corresponding to the longitudinal length of said roller; and guard member attachment means securing said guard member to said conveyor system.

3. The guard of claim 2, wherein said guard member further comprises inspection means for inspecting said desired clearances between said guard member and said exposed roller substantially throughout said longitudinal length.

4. The guard of claim 3, wherein said inspection means comprises a plurality of openings extending through said formed guard member.

5. The guard of claim 2, 3, or 4, further comprising a plurality of wiper members, affixed to said first and second guard member legs, said wiper members in sliding wiping contact with said belt.

6. The guard of claim 5, wherein said wiper members are made of urethane rubber.

7. The guard of claim 2, said attachment means further comprising a plurality of guard mounting brackets attached to receiving points on said conveyor frame, said guard member adjustably attached to said guard mounting bracket for alignment of said guard member relative said exposed roller.

8. A guard for a conveyor belt system, the conveyor belt system comprising a frame, a belt, an exposed roller supporting said belt, and attachment means attaching said exposed roller to said frame, said guard comprising: a guard member substantially enclosing said exposed roller, said guard member attached to receiving points on said conveyor frame by a plurality of bridge-shaped guard mounting brackets, said brackets comprising a bracket base and a pair of bracket extensions, said bracket base having at least one slot accepting attachment means affixing said bridge-shaped brackets to said receiving points on said conveyor frame, said slots permitting lateral adjustment of said guard member relative said roller, and said bracket extensions each having a slot, said slot accepting attachment means affixing said guard member to said bracket extension, said slot permitting vertical adjustment of said guard member relative said exposed roller.

9. The guard of claim 8 wherein said receiving points are said exposed roller attachment means.

* * * * *